Figure 1:
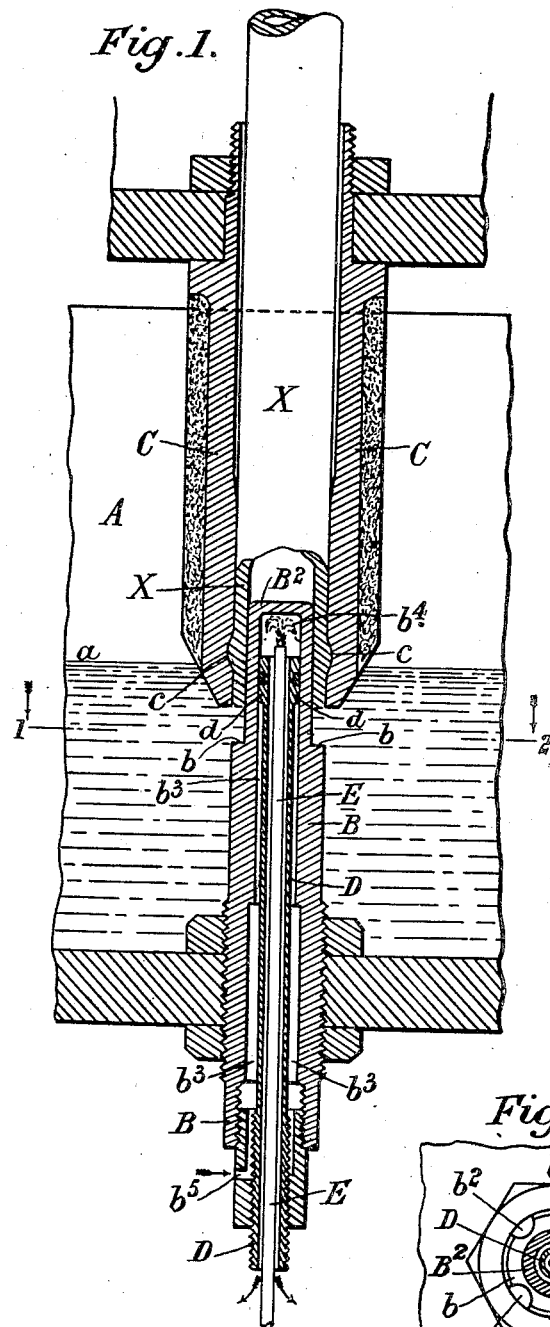

Aug. 4, 1925. 1,548,618
J. B. LANE
APPARATUS FOR THE MANUFACTURE OF PIPES, TUBES
OR ANALOGOUS ARTICLES FROM LEAD OR THE LIKE
Filed July 11, 1922  4 Sheets-Sheet 1

INVENTOR:-
JOHN BURR LANE
by his Attorneys
Howson and Howson

Aug. 4, 1925. 1,548,618
J. B. LANE
APPARATUS FOR THE MANUFACTURE OF PIPES, TUBES,
OR ANALOGOUS ARTICLES FROM LEAD OR THE LIKE
Filed July 11, 1922  4 Sheets-Sheet 2
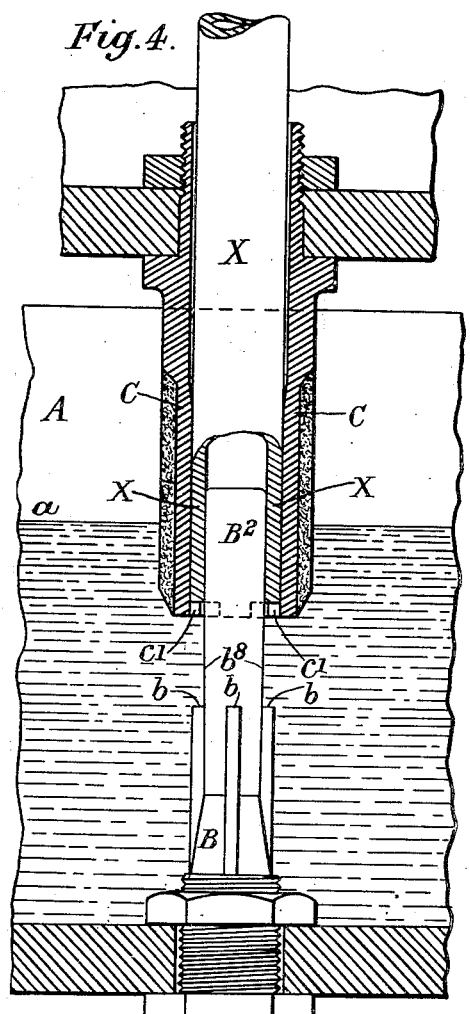
Fig.4.
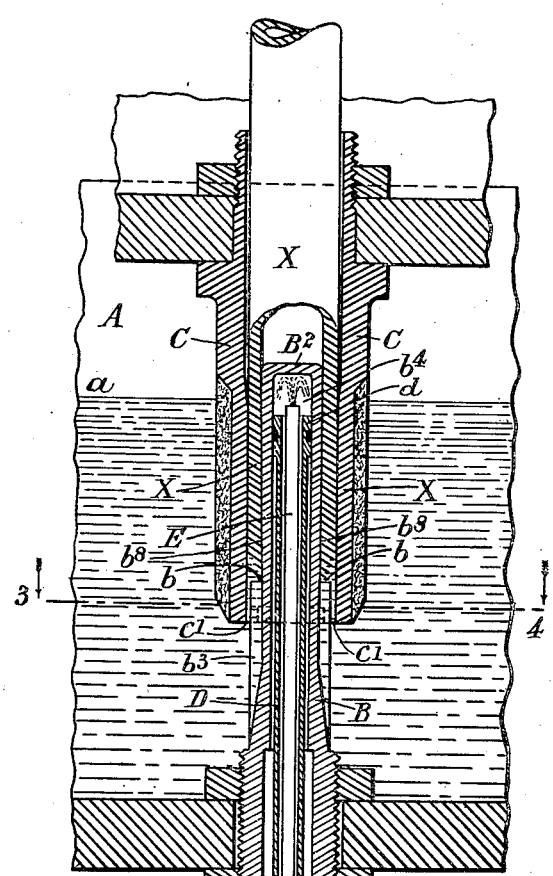
Fig.5.
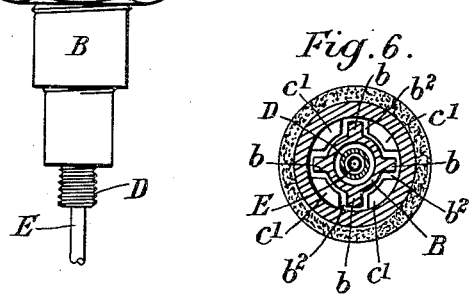
Fig.6.
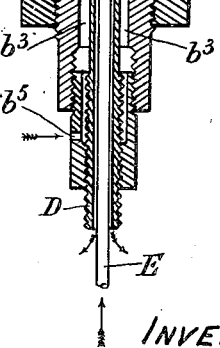
INVENTOR:-
JOHN BURR LANE
by his Attorneys
Howson and Howson Aug. 4, 1925.                                    1,548,618
J. B. LANE
APPARATUS FOR THE MANUFACTURE OF PIPES, TUBES,
OR ANALOGOUS ARTICLES FROM LEAD OR THE LIKE
Filed July 11, 1922           4 Sheets-Sheet 3
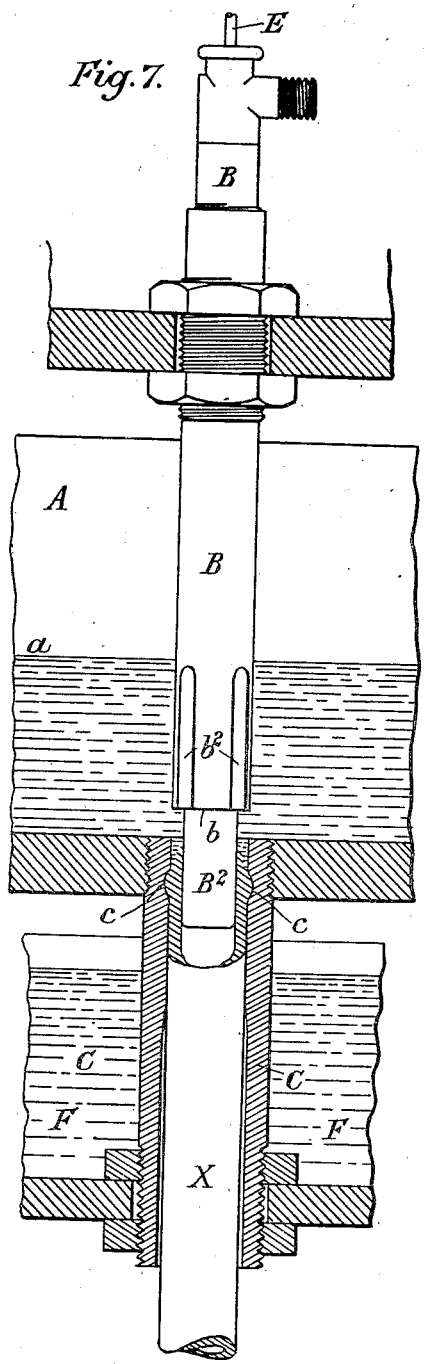
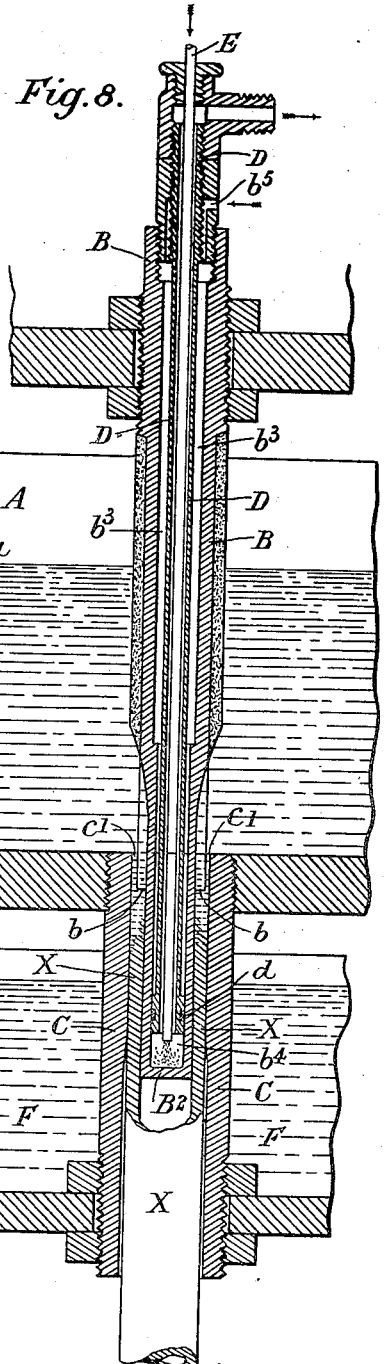
INVENTOR:-
JOHN BURR LANE
by his Attorneys
Howson and Howson

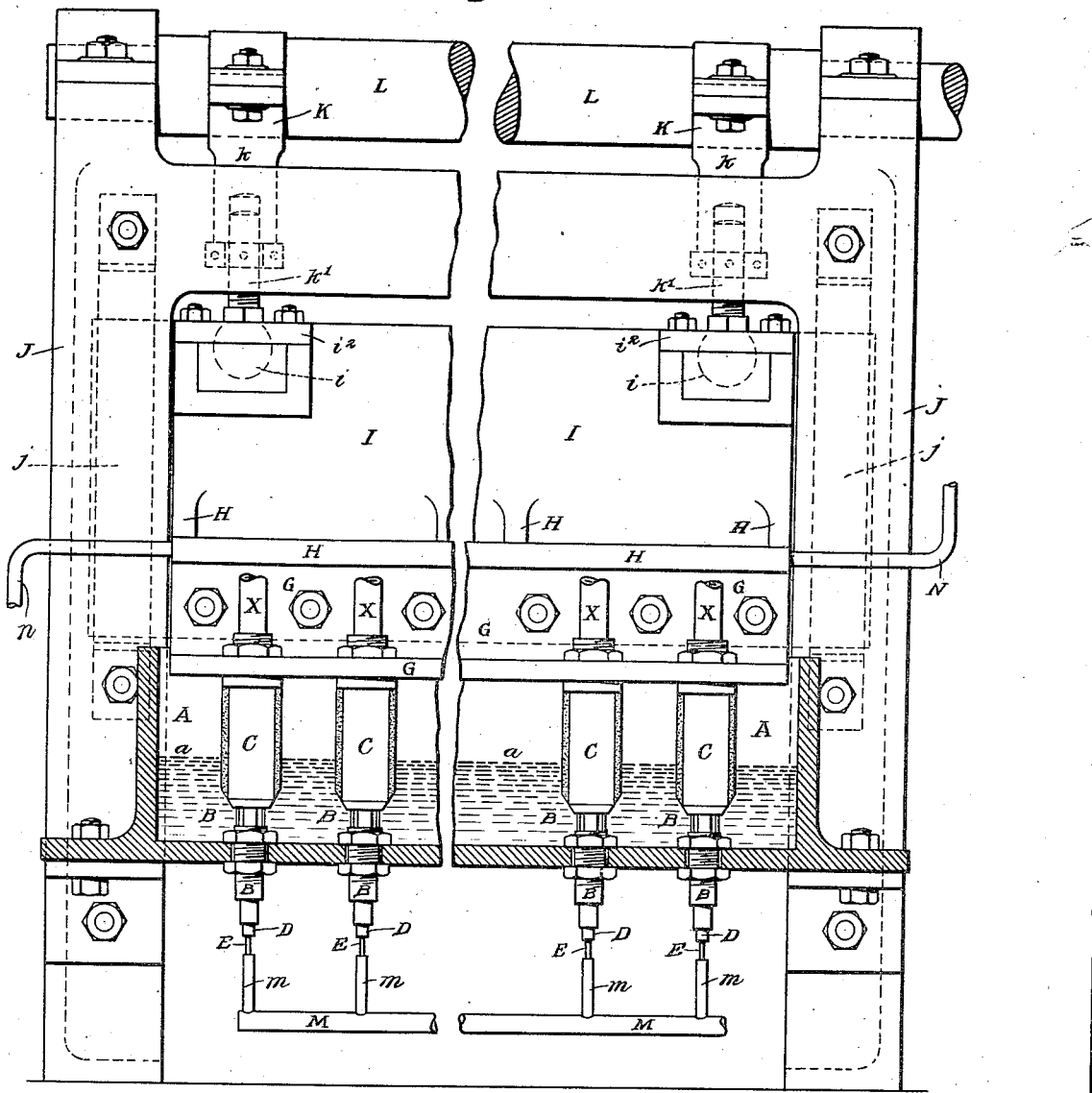

Patented Aug. 4, 1925.

1,548,618

UNITED STATES PATENT OFFICE.

JOHN BURR LANE, OF BERMONDSEY, ENGLAND.

APPARATUS FOR THE MANUFACTURE OF PIPES, TUBES, OR ANALOGOUS ARTICLES FROM LEAD OR THE LIKE.

Application filed July 11, 1922. Serial No. 574,349.

*To all whom it may concern:*

Be it known that I, JOHN BURR LANE, a subject of the King of Great Britain, residing at 45ª New Church Street, Bermondsey, in the county of London, England, have invented new and useful Improvements in and Apparatus for the Manufacture of Pipes, Tubes, or Analogous Articles from Lead or the like, of which the following is a specification.

The principal object of my invention is to manufacture pipes, tubes, or analogous articles, from lead, or the like, (by which I mean material which can be similarly rendered fluid by heat and will become solidified on cooling) in such manner that whilst they are expeditiously and economically produced, their freedom from flaws, or imperfections, is practically assured. For brevity of description I will presume that a lead pipe, cylindrical in transverse section, is to be manufactured and, from this description, the manufacture of analogous articles will also be understood. Sheets, strips or rods of lead are some of the analogous articles which can be made according to this invention.

According to my invention the lead employed in making the pipe is received from any suitable supply, such as a bath of molten lead, and is applied to the previously made portion of the pipe under formation, this application being made by effecting relative longitudinal movement between the walls enclosing the space between which the pipe is being formed, molten lead being received in the said space and in a recess, or in recesses, in one, or in both, of the walls and then this lead, after being sufficiently cooled, is, by the relative longitudinal movement between the walls, pressed laterally (that is transversely of the length of the pipe) into the lead of the previously formed portion of the pipe whilst it is confined in the space between the walls, the said lead being thus first forced into, and compacted with, the lead of the preceding portion into which it is forced and then, by the continuation of the forcing movement, the already formed portion is extruded from the space in which it has been formed as aforesaid.

The following description, with reference to the accompanying drawings, of apparatus in accordance with my invention, will explain how it can be carried into effect, but I do not limit myself to the precise arrangements hereinafter described and illustrated in the accompanying drawings.

Figure 3:
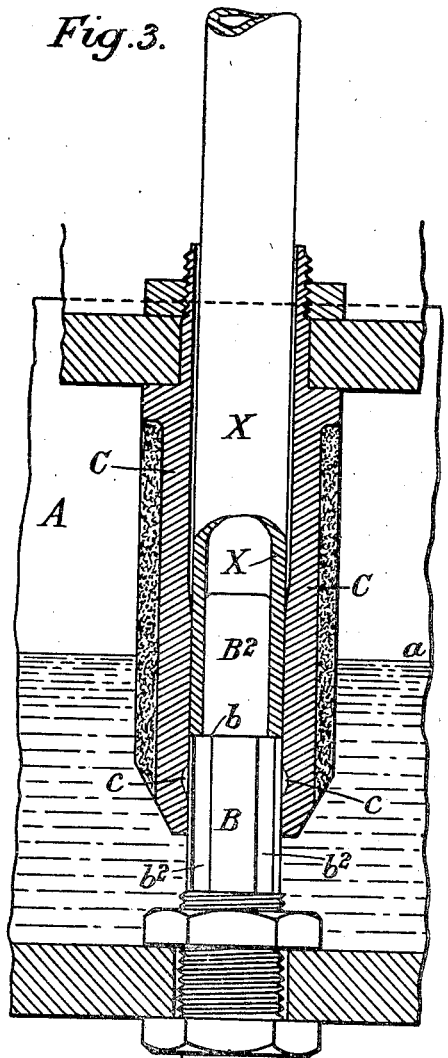
Figure 2:
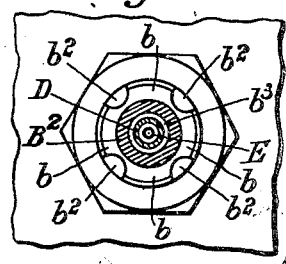

Figure 1 shews in vertical section and Figure 2 in transverse section, (on the line 1, 2, Figure 1) an apparatus for making cylindrical lead pipes according to this invention. Figure 3 is a section similar to Figure 1 but with the stationary cylindrical piece in elevation and with the reciprocative cylindrical piece at the end of the downstroke instead of at the end of its upstroke.

Figures 4, 5 and 6 illustrate a modification. Figure 4 shews the reciprocative cylindrical piece in vertical section and at the end of its upstroke whilst the stationary cylindrical piece is shewn in elevation. Figure 5 shews the reciprocative cylindrical piece at the end of its down stroke and both it and the stationary cylindrical piece in vertical section. Figure 6 is a transverse section on the line 3, 4, Figure 5. Figures 7 and 8 shew further modifications and Figure 9 shews, in elevation with parts in section, an apparatus having a number of devices in accordance with my invention in one lead bath and illustrates means for reciprocating the reciprocative cylindrical pieces.

In any suitable vessel A for containing molten lead, (indicated at $a$) I mount a stationary cylindrical piece B, at the upper end of which is a hollow mandrel, or core, $B^2$ which is of the diameter of the interior of the required pipe and is surrounded by an annular abutment, or shoulder, $b$, which is shewn as being at right angles to the length of the pipe, but which may be inclined outwards and downwards and stopped, or of other uneven surface this forming the upper part of the said stationary cylindrical piece B which piece B is of the diameter of the exterior of the required pipe. The said piece B, and the abutment, or shoulder $b$, are grooved at $b^2$ to form passages for molten lead from the vessel A. In axial line with the said stationary cylindrical piece B is a reciprocative cylindrical piece C which is of an internal diameter the same as that of the exterior of the required pipe and of the aforesaid stationary cylindrical piece B. The exterior of this cylindrical piece C may have a protective coating. Surrounding the interior of this reciprocative cylindrical piece C is an annular groove $c$ of a capacity to contain the amount of lead, to be added, at each reciprocation of the said piece C, to the pipe being made. Through the stationary cylindrical piece B and the hollow mandrel, or core $B^2$, water, or other cooling agent, is passed to cool the upper part, or end, of the said hollow mandrel, or core, the lower part of which is shewn as being insulated by an air space $b^3$ to prevent lead solidifying on the piece B, and obstructing the movement of the piece C.

The parts A, C, B and $B^2$ may be made of cast-iron, but Bessemer steel should be used for the parts B, $B^2$ when the apparatus is used for making lead pipes of small diameter. The circulation of the water, or other cooling agent, is shewn as being provided for by a tubular piece D entering the stationary cylindrical piece B, and terminating in an annular head $d$ which fits in the hollow mandrel, or core, $B^2$ and leaves the cooling space $b^4$ at the upper end of the said mandrel, or core, $B^2$ and separates that space from the space below the said head, $d$ between the exterior of the tubular piece D and the interior of the stationary cylindrical piece B and the lower part of the mandrel, or core $B^2$, this last named space constituting the aforesaid air insulation at $b^3$. The space $b^4$ above the said head $d$ receives the water, or other cooling agent, which is supplied through a tube E passing up into the space, within the tubular piece D, the water, or the like, escaping down between the said tube E and the said tubular piece D.

By making the aforesaid tubular piece D adjustable the cooling space $b^4$ above its head $d$ can be varied and the cooling effect be thus regulated.

As the reciprocative cylindrical piece C moves downwards from the position shewn in Figure 1 it carries down with it the lower end of the portion of the pipe X being formed because some of the solidified lead thereof is engaged with the annular groove $c$ in the said reciprocable cylindrical piece C and the lower end of the said portion of the pipe being formed, comes against the abutment on the stationary cylindrical piece B so that the said portion is arrested but, as the reciprocable cylindrical piece C continues to descend, it leaves the said portion of the formed pipe and, in doing so, the interior portion of the said reciprocable piece C, which is above the annular groove $c$ forces the metal which was in the said groove inwards sideways, or laterally, into the arrested formed portion of the pipe X being formed and, when the lead has been thus compacted into the said portion as far as possible, the remainder of the lead so forced in will cause a further portion of the pipe under formation to be extruded from the upper end of the reciprocable piece C which now ascends and carries up in its groove $c$ another charge of lead which it has received through the grooves $b^2$ in the stationary cylindrical piece B, the said charge, owing to the cooling action, setting on the piece under formation which is therefore carried up by the continued upward movement of the reciprocable piece, and by repetitions of the aforesaid movements any required length of pipe can be formed.

It will be evident that my invention is not confined to the particular construction described with reference to Figures 1, 2 and 3, as it can be varied in several respects; for instance, the recess, which receives the lead to be compacted into the pipe being formed, may be of any suitable shape and capacity and be either in the reciprocative part, or in the stationary part, or in both parts. The pipes can, if desired, be made of other than cylindrical shape in cross section. Moreover, the equivalent of the parts which I have described as being reciprocative may be stationary and the equivalent of the parts which I have described as being stationary may be reciprocative in which case the stationary cylindrical piece can be connected to an opening in the bottom of the container for the molten lead.

The following are examples of such modifications. In the modification shewn in Figures 4, 5 and 6, instead of the lead being pressed, laterally inwards by the reciprocative cylindrical part, the metal is pressed laterally outwards as the part of the pipe under formation passes over the stationary cylindrical part, the recess being formed in this stationary cylindrical part instead of in the reciprocative cylindrical piece, the said recess in this modification being shewn as being formed by a gradual inward and downward taper of the continuation $B^2$ of the stationary cylindrical part, as shewn at $b^8$. In this modification the parts which correspond to those shewn in Figures 1, 2 and 3 are marked with the same letters of reference. The molten lead enters the annular space between the outer wall of the stationary cylindrical piece B and its continuation $B^2$ and the inner wall of the reciprocative piece C, when the said reciprocative piece is in its lowered position as shewn in Figure 5, the said molten metal becoming solidified, or partially solidified, in the said space by the cooling action of the hollow mandrel, or core $B^2$. The compression of the lead in the said space is effected by internally projecting pieces $c^1$ on the lower end of the reciprocatory cylindrical piece C which projecting pieces upon the ascent of the said cylindrical piece, carry the solidified, or partially solidified, lead upwards on the tapered mandrel, or core, $B^2$, which causes the said lead to be compressed laterally as it comes into the reduced space between the upper cylindrical end of the said mandrel, or core, B² and the interior of the cylindrical piece C, as shewn in Figure 4. When the reciprocating cylindrical piece C again descends the tube X remains stationary and molten metal again enters the space between the inner wall of the said reciprocating piece and the inclined outer wall of the stationary cylindrical piece B and its continuation B², the shoulders b on the said stationary piece removing any metal that may have become adherent to the internally projecting pieces c¹.

Figures 7 and 8 are vertical sections illustrating modifications in which the outer cylindrical part is stationary and the inner cylindrical part and its adjuncts are reciprocative. Figure 7 shewing a construction analogous to that shewn in Figures 1, 2 and 3 thus arranged and Figure 8 shewing a construction analogous to Figures 4, 5 and 6 thus arranged, the parts which correspond to those shewn in these respective figures being marked with the same letters of reference. In both Figures 7 and 8 the cylindrical piece B, with its hollow mandrel, or core B², is reciprocable and the cylindrical piece C, through which the tube X passes as it is formed, is stationary. The upper end of the cylindrical piece C in each arrangement is shewn screwed into the bottom of the vessel (indicated at A) containing the molten lead and the said piece may, if desired, be cooled by any suitable means, for example by surrounding it by a cooling agent such as water contained in a vessel indicated at F. In the arrangement shewn in Figure 7 the solidified, or partially solidified, lead in the annular recess c is forced laterally inwards by the shoulder b upon the descent of the cylindrical piece B. In the arrangement shewn in Figure 8 the solidified, or partially solidified, lead is forced laterally outwards by the tapered mandrel, or core, B², upon the ascent of the cylindrical piece B, the inwardly projecting pieces c¹, on the upper end of the cylindrical piece C, acting as abutments.

In the arrangement shewn in Figures 4, 5 and 6, and also in the arrangements shewn in Figures 7 and 8, the cooling of the hollow mandrel, or core B² is shewn as being effected by means the same as those described with regard to the arrangement illustrated by Figures 1, 2 and 3 and corresponding parts are marked with the same letters of reference.

One, or any suitable number, of devices of the character hereinbefore described can be employed in one apparatus and any suitable means may be employed for operating the reciprocative part, or parts, such reciprocation may for example, be effected as illustrated in Figure 9 which shews, in elevation with the mid-part broken away and with the vessel A, containing the molten lead, in section, an apparatus comprising a number of devices similar to those described with reference to Figures 1, 2 and 3 for simultaneously making a number of pipes X. In the apparatus shewn the reciprocative parts C are secured to the horizontal flange of the L-shaped bar G, the vertical flange of which is bolted to a forwardly projecting piece H, formed integrally with a reciprocative plate I slidable between the frame, or uprights, J and the guiding strips j, secured thereto. The plate I is reciprocated by means of eccentrics K formed on, or secured, to a driving-shaft L, rotatably mounted in bearings carried by the frame, or uprights, J, the straps k, of the said eccentrics being connected to the plate I, preferably through rods k¹, with spherical ends engaging corresponding recesses i, in connection with the plate I, and secured by means of confining covers i², this connection allowing for angular movement of the said eccentric straps.

M indicates a water-supply pipe, having branches m connected to the pipes E, for supplying water to the interior of the cylindrical piece B, as hereinbefore explained. If desired the forwardly projecting piece H, may be hollow for the circulation of a cooling agent, such as water, through the pipes N and n, to cool the said piece H and its adjuncts.

The vessel A may be provided with any suitable means, such, for example, as gas jets, for maintaining the lead in the required molten condition. It will be apparent that with this construction the level of molten metal in the bath A can be kept constant by feeding from the melting pot, and that the gas jets for heating the molten metal and the flow of water through cooling space b⁴ can be adjusted at will. In the claims the word lead should be understood to include lead or any other metal which can be similarly-moulded.

What I claim is:—

1. In a process for manufacturing lead pipe, the production of pipe by means of continuous relative reciprocation of two walls between which the pipe is formed, contact between the pipe and molten metal being continuous.

2. In a process of manufacturing lead pipe in which the pipe and molten metal are kept in continuous contact between two walls, the production by relative longitudinal reciprocation of the walls of such conditions of temperature that fusion of said pipe and molten metal takes place by cooling.

3. In a process of manufacturing lead pipe, keeping the pipe and molten metal in continuous contact in one space, producing such conditions of temperature that fusion of said pipe and molten metal takes place by cooling, and controlling the amount of the partial withdrawal of the pipe from the space in order to permit the next fusion by the conditions of temperature.

4. The process of manufacturing lead pipe which consists in causing the molten metal to be received in a space between walls having longitudinal reciprocatory movement the one relatively to the other, and forcing said metal laterally of the length of the pipe into and compacting it with the portion of the pipe previously formed in the said space, substantially as described.

5. The process of manufacturing lead pipe which consists in causing the molten metal to be received by gravity in a space between walls having longitudinal reciprocatory movement the one relatively to the other, cooling said metal and forcing said metal laterally of the length of the pipe into and compacting it with the portion of the pipe previously formed in the said space by the reciprocatory movement of the walls, substantially as described.

6. In a lead pipe-making machine, two molding elements, and a source of molten metal in communication with the space between said molding elements, in combination with means for inducing longitudinal movement of the molding elements relatively to each other to thereby cast and compress lengths of pipe, and compact same with the previously formed length.

7. In a lead pipe-making machine, a core and a mold, means to reciprocate one longitudinally with respect to the other, a source of molten metal in constant communication with the space between said core and mold, means adapted to cool the head of said core, one of the two molding members having a recess on its molding wall, in combination with means on one of said molding members adapted to force the metal in said recess laterally to the length of the pipe into and compacting it with the previously formed length.

8. In a lead pipe-making machine, two walls having a space between them such that they correspond to the cross-sectional shape and size of the exterior and interior of the pipe to be made, one of said walls having a recess therein, a molten metal container in communication with the space between the walls, in combination with means for imparting longitudinal reciprocation of the walls one relatively to the other, means tending to cool the metal received in the recess and means for forcing said lead laterally to the length of the pipe and compacting it with the previously formed length.

9. In a lead pipe-making machine, two walls having a space between them such that they correspond to the cross-sectional shape and size of the exterior and interior of the pipe to be made, one of said walls having a recess therein, a vessel adapted to contain molten lead in constant communication with said space, in combination with means to reciprocate one of said walls longitudinally with relation to the other, means in the interior wall tending to cool the molten metal, and means on one of the said walls for forcing the lead in the recess laterally to the length of the pipe, compacting it with the previously formed portion of the pipe and extruding some of the previously formed portions.

10. In a lead pipe-making machine, a vessel adapted to contain molten metal, a stationary hollow molding member projecting upward in said vessel which, at its upper end, is equal in external diameter to the interior of the pipe to be made, in combination with a reciprocatory molding member of an internal diameter equal to the external diameter of the pipe to be made and adapted to fit over said stationary hollow member, a recess around one of the opposed walls formed by the molding members, means for reciprocating said reciprocative member and means for cooling the end of said stationary member substantially as described.

11. In a lead pipe-making machine, a vessel adapted to contain a molten metal, a stationary hollow member projecting upward in said vessel, which at its upper end, is of an external diameter equal to the interior of the pipe to be made, a recess around the exterior of said hollow member, in combination with a reciprocative member of an internal diameter equal to the external diameter of the pipe to be made, said reciprocative member fitting over said stationary hollow member and adapted to permit molten metal to flow from said vessel into the space between said stationary and reciprocative member, teeth on the lower end of said reciprocative member adapted to force the lead in said recess laterally to the length of the pipe, compacting it with the previously formed portion of the pipe.

12. In a lead pipe-making machine having a core and a mold with means adapted to reciprocate one of said members longitudinally with respect to the other, means for passing a cooling medium to the end of said core, said means consisting of a tubular piece inside said core, a head on said tubular piece which fits said core and leaves a cooling space at the end thereof, there being an air space between the said tubular piece and the lower part of the interior of the core, in combination with a tube for supplying the cooling medium to the said end space, there being means for the return of the cooling medium between the said tube and the tubular piece through which it passes.

13. In a process for manufacturing a lead body, the production and compacting of the body by means of continuous relative reciprocation of two walls between which it is formed, contact between the body and the molten metal being continuous.

14. The process of manufacturing a lead body which consists in causing the molten metal to be received by gravity in a space bwteeen walls having longitudinal reciprocatory movement the one relatively to the other, cooling said metal and forcing it, laterally of the length of the body being made, into and compacting it with the portion of the body previously formed in the said space by the reciprocatory movement of the walls.

15. In a machine for making lead bodies, two molding elements, and a source of molten metal in communication with the space between said molding elements, in combination with means for inducing longitudinal movement of the molding elements relatively to each other to thereby cast and compress lengths of the desired body, and compact same with the previously-formed length.

16. In a machine for making lead bodies, two walls having a space between them which corresponds to the cross section of the body to be made, one of said walls having a recess therein, a vessel adapted to contain molten lead in constant communication with said space, in combination with means to reciprocate one of said walls longitudinally with relation to the other, means in one wall tending to cool the molten metal, and means on one of said walls for forcing the lead into the recess laterally of the length of the body being formed, compacting it with the previously formed portion of the body and extruding some of the previously formed portions.

17. In a process of manufacturing lead pipe in which the pipe and molten metal are kept in continuous contact, the casting and compressing of lengths of pipe and compacting of same with the previously formed length by continuous relative longitudinal movements of the molding elements.

In testimony whereof I have signed my name to this specification in the presence of two subscribing witnesses.

JOHN BURR LANE.

Witnesses:
KENNETH GEORGE ARTHURS,
CHARLOTTE DAVIES.